E. R. FILLMORE.
DESICCATING MACHINE.
APPLICATION FILED DEC. 17, 1908.

939,126.

Patented Nov. 2, 1909.
4 SHEETS—SHEET 3.

Inventor.
Eldon R. Fillmore
by Wilhelm, Parker & Hand
Attorneys.

UNITED STATES PATENT OFFICE.

ELDON R. FILLMORE, OF MEDFORD, MASSACHUSETTS, ASSIGNOR TO DANIEL E. KNOWLTON, OF BUFFALO, NEW YORK.

DESICCATING-MACHINE.

939,126.  Specification of Letters Patent.  Patented Nov. 2, 1909.

Application filed December 17, 1908. Serial No. 467,945.

*To all whom it may concern:*

Be it known that I, ELDON R. FILLMORE, a citizen of the United States, residing at Medford, in the county of Middlesex and State of Massachusetts, have invented a new and useful Improvement in Desiccating-Machines, of which the following is a specification.

The invention relates to improvements in machines for desiccating liquid or semi-liquid materials, and more especially to machines for desiccating eggs and milk.

The primary object of the invention is to produce an efficient and practical machine of large capacity which can be economically operated and will produce desiccated material of superior quality.

More specific objects of the invention are to provide a machine for desiccating purposes in which the material is spread in thin films on a stationary drying surface and is scraped off said surface after desiccation by a traveling spreading and scraping mechanism, whereby the product will be more evenly dried and of a more uniform flakey character than has heretofore been produced; also to produce a machine of this nature for desiccating two materials simultaneously, thereby enlarging the capacity and scope of the machine; and also to improve desiccating machines of this character in the several respects hereinafter described and set forth in the claims.

In the accompanying drawings, consisting of four sheets.

Like characters of reference refer to like parts in the several figures.

Briefly stated, the machine is organized and operates as follows: It comprises a stationary horizontal drying table arranged within a drying chamber, and two spreading and scraping mechanisms which are reciprocated one above and the other below the table for spreading the material in thin films or layers on the top and bottom surfaces of the table for drying it and for removing the dried material. The lower mechanism, which is designed especially for handling egg batter, comprises a trough which is arranged in the drying chamber transversely below the table, and to which the egg batter is automatically fed from a supply tank or reservoir. A roller, located in the trough, is adapted to roll against the under side of the table during the movement of the mechanism in one direction for spreading the batter thereon, and is held out of contact with the table during the return movement of the mechanism to allow the batter deposited on the table to dry. The mechanism may be thus reciprocated a plurality of times to deposit several films of batter on the table. After a sufficient quantity of the batter has been deposited and dried on the table, the spreading roller is shifted out of engagement with the table and the scraping device is shifted into position to scrape the dried batter from the table. The upper mechanism, which is especially designed for milk, comprises a roller adapted to roll on the upper surface of the table for spreading the milk thereon, and a tank from which the milk is fed to the spreading roller. As in the case of the lower mechanism, the roller is held in engagement with the table during the movement of the mechanism in one direction for spreading the milk thereon, and is held off the table during the return movement of the mechanism to allow the milk to dry, and after a sufficient quantity of milk has dried on the table the spreading roller is shifted out of operative position and the scraping device into position for removing the dried milk. The upper and lower mechanisms are preferably operated by a common drive mechanism which moves the two mechanisms simultaneously in opposite directions.

Figure 1:
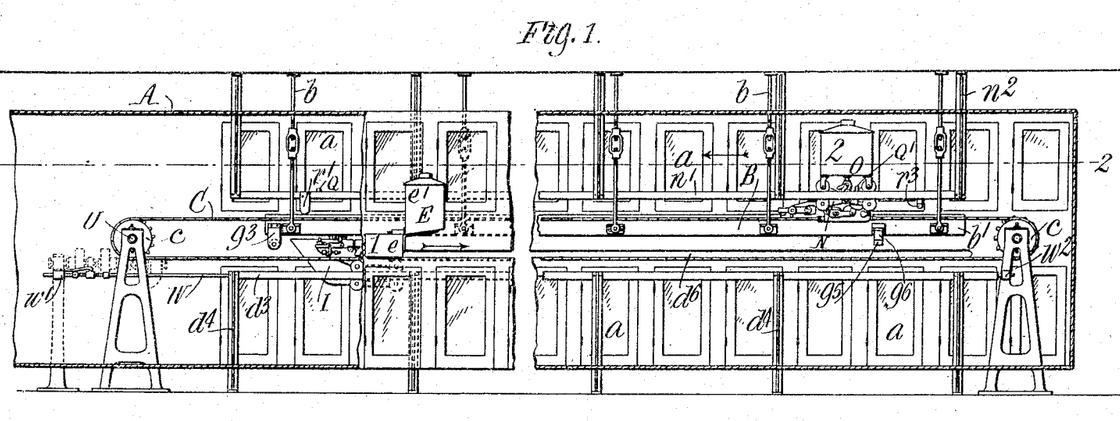
Figure 1 is a broken longitudinal section, partly in elevation, of a desiccating machine embodying the invention.
Figure 2:
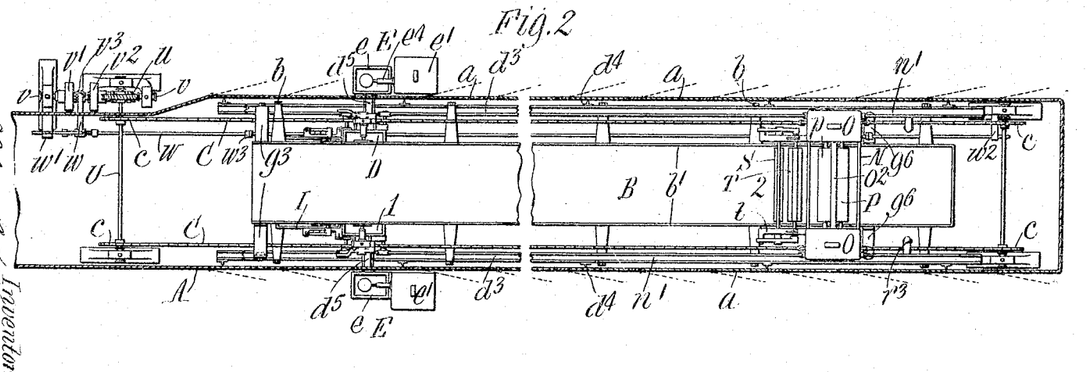
Fig. 2 is a sectional plan view thereof on line 2—2, Fig. 1.

A represents an elongated horizontal drying chamber within which the drying table B and the reciprocating spreading and scraping mechanisms are inclosed and to which heated air is supplied by suitable means (not shown). The casing of the drying chamber may be of any suitable construction and it is preferably provided in its opposite long sides with doors $a$ which afford access to the inclosed mechanism. The table B is arranged lengthwise within the drying chamber and is suspended therein by suitable hangers or supports $b$, Figs. 1 and 2. The table, which may be made of wood or other suitable material, has plain or flat upper and lower surfaces and is preferably provided along its opposite edges with upwardly-extending flanges or strips $b'$, Figs. 2, 4 and 13, to confine the material on the upper surface thereof.

1 and 2 represent respectively the lower and upper, or egg and milk, spreading and scraping mechanisms which are arranged respectively below and above the table, and, in the construction shown, are connected to the lower and upper runs of endless chains C which pass around wheels $c$ located beyond the opposite ends of the table and are reciprocated or driven alternately in opposite directions by mechanism hereinafter described, for reciprocating the two spreading and scraping mechanisms so that they move simultaneously in opposite directions.

The lower spreading and scraping mechanism, which, as before stated, is designed more especially for handling egg batter, is preferably constructed as follows: D represents a trough or receptacle which is arranged transversely beneath the drying table and is carried by a truck or carriage consisting of opposite frames $d$ through which extend axles $d'$ provided at their opposite ends with grooved wheels $d^2$. There are preferably an upper and a lower pair of wheels at each end of the carriage which travel respectively on the upper and lower flanges of I-rails $d^3$ which are arranged horizontally in the drying chamber at opposite sides thereof and are secured to suitable posts or supports $d^4$. The side frames of the carriage are provided with lateral arms $d^5$ which project out through horizontal slots $d^6$ in the side walls of the casing A and support supply tanks or reservoirs E for the egg batter outside of the drying chamber. Each supply tank or reservoir comprises a lower receptacle or compartment $e$, see Figs. 1, 4, 7 and 15, and an upper receptacle or compartment $e'$. The lower receptacles are connected with the trough D by pipes or passages $e^2$ which extend through the arms $d^5$ of the carriage, which arms are preferably hollow. The upper receptacle of each reservoir or tank is secured to and supported on the lower receptacle by a bracket $e^3$, Fig. 15, or in any other suitable manner, and is provided with a discharge spout $e^4$ for delivering the batter into the lower receptacle. A float-controlled valve $e^5$ of any suitable construction, actuated by the change of level of the batter in the lower receptacle, controls the feed from the upper receptacle to the lower one and so maintains the batter at a constant level in the trough D. The supply tanks or reservoirs being arranged outside of the drying chamber as described, are not subjected to so great a heat as they would be if located within the drying chamber. This is desirable, because if the batter becomes too thick the feed thereof to the trough cannot be regulated with as much certainty, and the thickening of the batter also interferes with spreading the same in uniformly thin films on the drying surface. The trough could be mounted to reciprocate below the drying table and the batter fed thereto in any other suitable way.

Figures 3, 4, 5, 6:
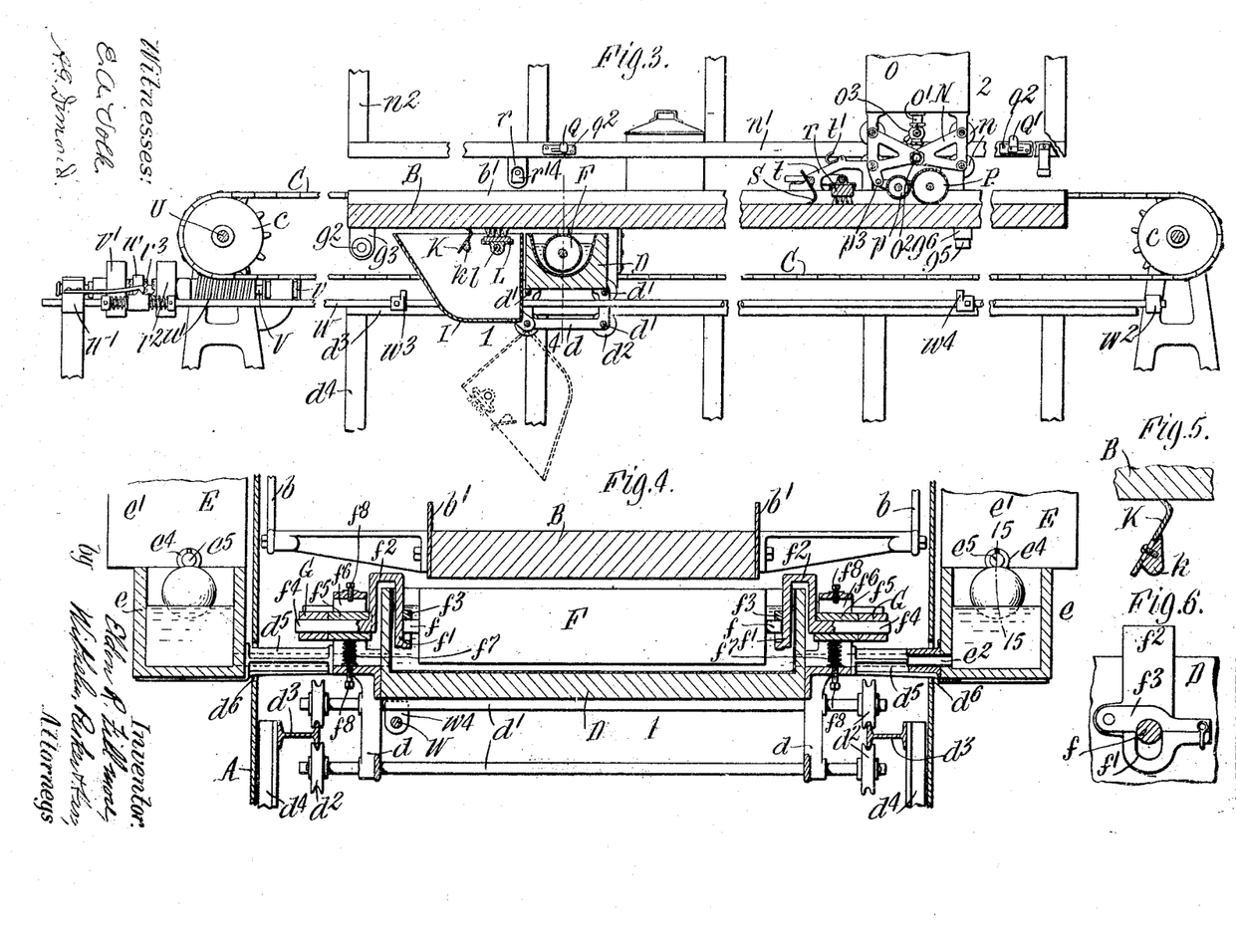
Fig. 3 is a fragmentary sectional elevation thereof on an enlarged scale, omitting the casing of the drying chamber.
Fig. 4 is a transverse sectional elevation on an enlarged scale, in line 4—4, Fig. 3.
Fig. 5 is a detail section of the scraper of the lower spreading and scraping mechanism.
Fig. 6 is a sectional elevation of one of the journal boxes for the roller of the lower spreading and scraping mechanism.

F represents a spreading roller which is located in the trough D and is provided at its opposite ends with journals $f$ which are removably seated in bearings $f'$, Figs. 4 and 6, in the inner ends of bearing arms $f^2$ which depend into the trough D. The journals are detachably retained in the bearings by any suitable means, such as pivoted keepers or latches $f^3$, see Fig. 6. The bearing arms for the roller extend laterally over the ends of the trough D and are provided outside thereof with horizontal trunnions $f^4$ journaled in bearing boxes $f^5$ which are movable vertically in guideways $f^6$ provided on the side frames of the trough carriage. Springs $f^7$, arranged in the guideways below the bearing boxes, tend to lift the same and hold the spreading roller up yieldingly against the under side of the drying table. The vertical movements of the roller are limited by adjustable screws $f^8$ at the upper and lower ends of the guideways.

Figures 7, 8, 9, 10, 11:
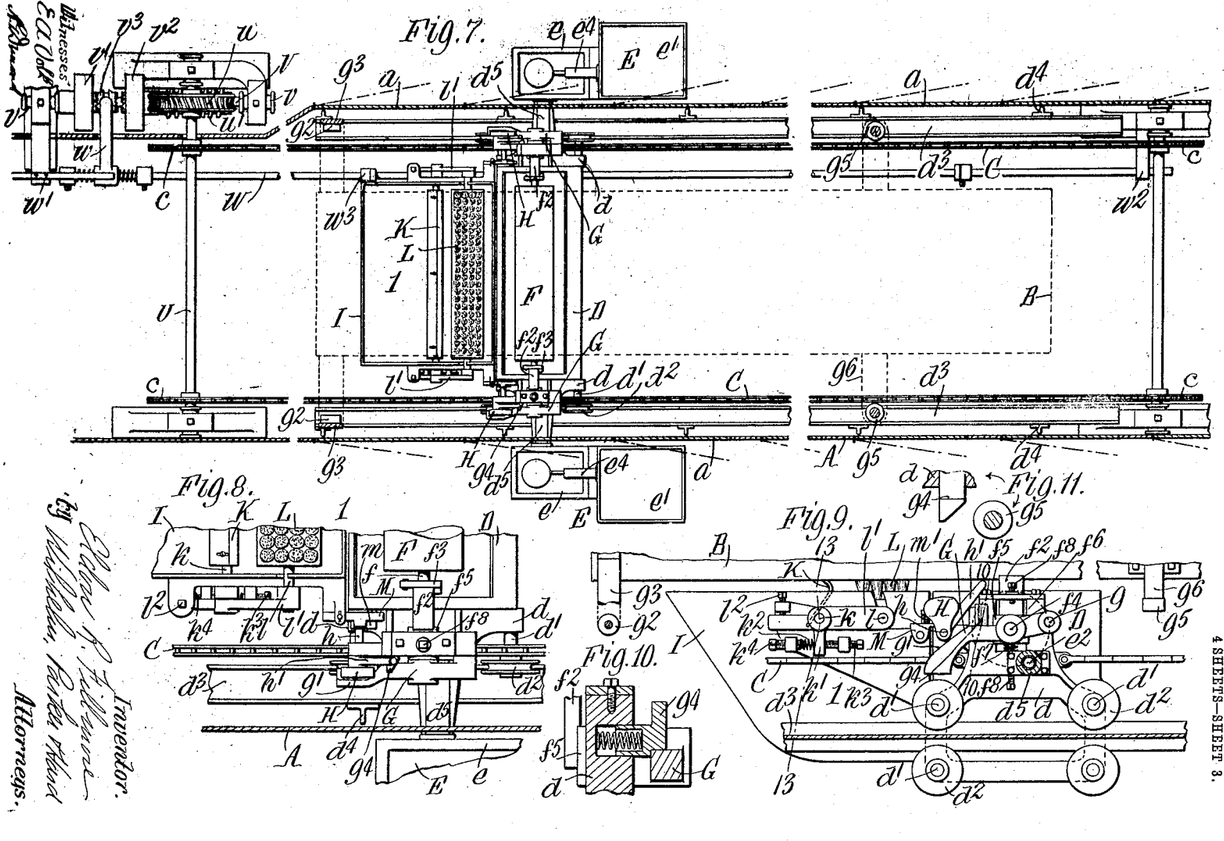
Fig. 7 is a fragmentary sectional plan view of the machine, omitting the table and upper spreading and scraping mechanism.
Fig. 8 is a fragmentary sectional plan view, on an enlarged scale, of one end of the lower spreading and scraping mechanism.
Fig. 9 is a side elevation, partly in section, of the lower spreading and scraping mechanism.
Fig. 10 is a detail sectional elevation in line 10—10, Fig. 9, showing the latch for holding the spreading roller out of engagement with the table.
Fig. 11 is a fragmentary sectional plan view of the latch and its operating device.

As the lower scraping and spreading mechanism is reciprocated beneath the drying table the spreading roller is held yieldingly against the under side of the table so as to roll thereon and apply the batter thereto during the movement of the mechanism in one direction, and is depressed and held out of contact with the table during the return movement of the mechanism to allow the batter to dry. For this purpose the following means are employed:

Actuating arms G, Figs. 7, 8 and 9 are pivoted at $g$ to the side frames of the trough carriage and have sockets into which the outer ends of the trunnions $f^4$ of the roller bearing arms extend. The free ends of the actuating arms G are provided with inclined faces $g'$, Fig. 9, which, when the carriage approaches the limit of its movement in one direction, for instance, to the left in Figs. 3 and 7, are adapted to engage rollers $g^2$ journaled on brackets $g^3$ projecting laterally from opposite sides of the drying table, see Figs. 1, 2 and 3. When the actuating arms strike these rollers their free ends are depressed, which lowers the bearing arms and depresses the spreading roller F out of contact with the drying table.

$g^4$, Figs. 8–11, represents a spring-pressed latch or plunger which is mounted in each carriage side frame adjacent to the actuating arm G. When the actuating arms are depressed as stated, the latches $g^4$ are projected outwardly by their springs over the actuating arm and retain the free ends of the arm down and the roller out of contact with the table until the carriage approaches the limit of its movement in the opposite direction, when inclined faces on the latches $g^4$ are engaged by rollers $g^5$ mounted on brackets $g^6$, Figs. 1, 3, 7, 9 and 11, and the latches are retracted, freeing the actuating arms G and permitting the spreading roller F to be raised into contact with the drying table by its springs $f^6$. This forms a simple and effective means of automatically shifting the spreading roller into and out of operative engagement with the table in accordance with the movements of the carriage, but the roller could be mounted so as to be raised and lowered in the trough in any other suitable manner and shifted into and out of operative engagement with the table by any other suitable means.

For holding the spreading roller down out of engagement with the drying table when the dried material is to be scraped off the table, or when, for any other reasons, it may be desired to hold the spreading roller out of action as, for instance, when it is desired to use the upper spreading and scraping mechanism alone, a cam H, Figs. 8 and 9, is preferably employed which is located over the free end of each actuating arm G and is secured to a rock shaft $h$ which is journaled in a bearing on the side frame of the trough carriage and is provided with a lever or arm $h'$. The cam H can be turned by the arm $h'$ into a position to engage the free end of the actuating arm G to depress and hold the spreading roller out of engagement with the table.

I, Figs. 1, 3, 9 and 13, represents a receptacle mounted on the trough carriage for receiving the desiccated material scraped from the under side of the drying table. This receptacle is hinged at its bottom conveniently to the adjacent lower axle $d'$ of the trough carriage so that it can swing from the horizontal position shown in full lines in Figs. 3 and 9, in which it receives the material, to the position shown by broken lines in Fig. 3, for dumping the material.

K represents a knife or scraper mounted in the receptacle I for removing the dried material from the under side of the table. This knife or scraper is preferably adjustably secured to a shaft $k$, Figs. 5–13, which is journaled at its ends in bearings on the ends of the receptacle I. An arm $k'$, Fig. 9, is secured to each end of the scraper shaft and is held by a spring $k^2$ against an adjustable screw or stop $k^3$ on the end of the receptacle I. An adjustable screw $k^4$ is provided for regulating the tension of the spring $k^2$. The springs $k^2$ acting on the arms of the scraper shaft hold the scraping edge in engagement with the under side of the table and permit the scraper to yield so that it will accommodate itself to the surface of the table and properly scrape the dried material therefrom. A brush L is also arranged in the receptacle I in rear of the scraper K for brushing the under side of the table to remove particles of material which may be left adhering thereto by the scraper. This brush is preferably secured to a shaft $l$, the ends of which extend out through slots in the ends of the receptacle I and are supported in one end of arms $l'$ which are pivoted on the ends of the scraper shaft $k$ with their opposite ends bearing against adjustable screws or stops $l^2$ on the sides of the receptacle I. By adjusting these screws $l^2$ the brush can be held with the requisite pressure against the under side of the table. The dried material removed from the under side of the drying table by the scraper and brush falls into the receptacle I and can be discharged therefrom by swinging the receptacle down to the position shown by dotted lines in Fig. 3.

While the scraper and brush are adjustably secured in the receptacle I as described, they may, if desired, be mounted on some other part of the spreading and scraping mechanism, and the mechanism could be provided with other means for removing and receiving the dried material. Any suitable means may be employed for holding the receptacle I in its receiving position with its knife K in scraping engagement with the table. In the construction shown, a latch M is pivoted at each side of the receptacle I and is adapted, when the receptacle is raised to the receiving position, to engage a suitable catch on the trough carriage. The inner ends of the shafts $h'$ for the cams H which hold the spreading roller in its inoperative position are provided with cam heads $m$, Fig. 14, beneath the latches M. A suitable spring $m'$, Fig. 14, presses the latch in a direction to hold it in engagement with its catch. This latch construction is such that when the cams H are turned to allow the spreading roller to be raised into engagement with the drying table, the turning of the cam heads $m$ will release the latches M so that the receptacle I can swing downwardly to dump the material. After the table has been scraped the catch M is released to allow the receptacle to swing down to its discharging position, where it is allowed to remain until another quantity of the egg batter has been deposited and dried on the under side of the table, when the receptacle is again secured in its scraping and receiving position.

The upper spreading and scraping mechanism corresponds in its general features with the lower spreading and scraping mechanism but is designed more especially for milk or other liquid material which will flow more readily than the egg batter. Like the lower mechanism, it is carried by a truck or carriage N provided at its opposite ends with upper and lower pairs of grooved wheels $n$ which travel respectively on the upper and lower flanges of I-rails $n'$ which are arranged horizontally in the drying chamber at opposite sides thereof but are suspended from above by suitable hangers or supports $n^2$. Two milk tanks or reservoirs O are supported on the carriage at opposite ends thereof and are provided with discharge pipes O′ which depend from the tanks outside of the side frames of the carriage N and are joined by a horizontal pipe $O^2$ having bottom perforations. Valves $O^3$ are provided in the discharge pipe O′ which are automatically operated, as hereinafter described, to turn on and shut off the feed of milk.

P represents a horizontal transverse roller which is adapted to bear against and roll on the upper surface of the drying table for spreading the milk thereon, and $p$ is a distributing roller arranged above the drying table parallel with and bearing against one side of the spreading roller. The two rollers are arranged so that the valley between them forms a trough which is located below the perforated feed pipe and is adapted to receive the milk discharging therefrom. The two rollers revolving in contact with each other serve to distribute the milk over the surface of the spreading roller which spreads or applies it in a thin film on the upper surface of the drying table. If desired, the rollers may be covered with cloth or other material for facilitating the uniform distribution and spreading of the milk upon the table.

The spreading roller P is provided at opposite ends with journals which are removably seated in bearings of any suitable sort which are movable vertically on the carriage N and are connected to the free ends of arms $p^2$ which are pivoted to the carriage side frames on the outer side thereof at $p^3$ so that the arms can swing vertically to allow of the up and down movements of the spreading roller. The distributing roller $p$ is provided with journals at its ends which bear in boxes $p^4$ which are movable toward and from the spreading roller P in guide openings in the pivoted arms $p^2$. Adjusting screws $p^5$ are provided on the arms $p^2$ for securing the journal boxes $p^4$ in proper position to cause the distributing roller to bear with the desired pressure against the spreading roller.

Figures 12, 13, 14, 15, 16:
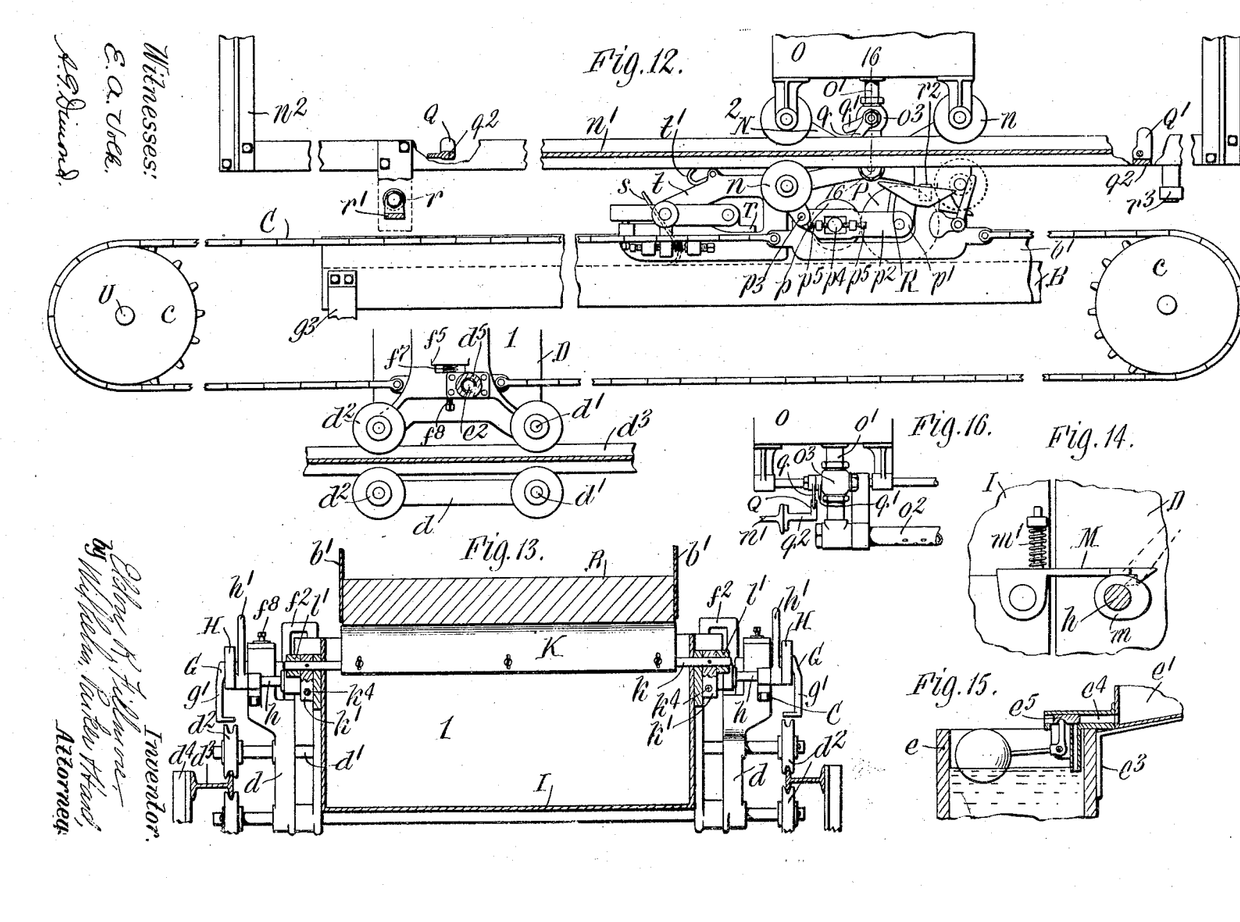
Fig. 12 is a fragmentary sectional elevation of the upper and lower spreading and scraping mechanism and the driving means therefor.
Fig. 13 is a transverse sectional elevation in line 13—13, Fig. 9.
Fig. 14 is an elevation, partly in section, of the latch for the desiccated egg receptacle.
Fig. 15 is a sectional elevation in line 15—15, Fig. 4, showing the device for controlling the feed of the material to the lower spreading mechanism.
Fig. 16 is a fragmentary sectional elevation of the feed mechanism for the milk, in line 16—16, Fig. 12.

As in the case of the lower spreading mechanism, the spreading roller bears against the table so as to apply the milk thereto during the movement of the carriage in one direction, and is lifted and held out of contact with the table during the return movement of the carriage to allow the milk to dry, and the milk is fed to the rollers during the movement of the carriage in which the spreading roller bears on the table, and is shut off during the return movement of the carriage. For this purpose the following means are preferably employed:

The stems of the discharge valves $O^3$ are provided with arms $q$ and $q'$, Figs. 12 and 16, and tappet arms or projections Q Q′ are secured to brackets $q^2$ projecting inwardly from the rails $n'$ and located respectively in the paths of the arms $q$ and $q'$. When the carriage approaches the limit of its movement in one direction, the tappets Q strike the valve arms $q$ and turn the valves to open them to allow the discharge of the milk, and when the carriage approaches the limit of its movement in the opposite direction the other tappets Q′ strike the valve arms $q'$ and close the valves.

The supporting arms $p^2$ for the spreading roller are provided at their free ends with laterally projecting portions provided with inclined faces R which, when the carriage approaches the limit of its forward movement, are engaged by rollers $r$ journaled on brackets $r'$ projecting inwardly from the hangers for the carriage rails, and are lifted thereby to raise the spreading roller out of engagement with the table. When the arms are thus lifted, spring-pressed latches $r^2$ of any suitable construction are projected outwardly by their springs into engagement with parts of the arms $p^2$ so as to hold the same with the spreading roller in the raised position. These latches $r^2$ have beveled or inclined faces adapted, when the carriage approaches the limit of its return movement, to strike rollers $r^3$ journaled on brackets projecting inwardly from the supports for the carriage rails, whereby the latches are pressed inwardly against the action of their springs and release the roller-supporting arms so that the spreading roller can drop into engagement with the table.

While the means above described, for controlling the feed of milk to the spreading roller and for mounting this roller in its carriage and shifting it into and out of engagement with the surface of the table, form a simple and efficient construction, any other suitable and desirable construction may be employed for this purpose.

S represents a scraper or knife adapted to engage the upper surface of the table for removing the dried milk therefrom, and T represents a brush arranged in rear of the scraper for sweeping the table to remove portions of the dried milk which are left adhering to the table by the scraper. The scraper and brush are adjustably mounted in a frame $t$ in substantially the same manner as the scraper and brush of the lower spreading and scraping mechanism are mounted, or they can be mounted in any other suitable manner so as to hold the scraper in yielding contact with the table and so that the pressure of the brush on the table can be regulated. Any other suitable means for removing the dried material from the table may be employed. The frame $t$ on which the scraper and brush are mounted is hinged to the carriage N, conveniently to the adjacent lower axle of the carriage, so that the frame can be raised to lift the scraper and brush out of operative engagement with the table. Hooks $t'$ are shown on the frame $t$ for engagement with the adjacent upper axle of the carriage to hold the scraper frame up in its inoperative position.

The dried material is moved along the surface of the table by the scraper and brush to the end of the table, where it may be removed by hand or in any other suitable manner.

Any suitable drive mechanism may be employed for driving the endless chains C to which the upper and lower spreading and scraping mechanisms are attached for reciprocating these mechanisms simultaneously in opposite directions. In the mechanism shown, the chain wheels $c$ at one end of the apparatus are secured to a shaft U, Figs. 1, 3 and 7, which is provided at one end with a worm wheel $u$ meshing with a worm $u'$ on a drive shaft V which is journaled in suitable bearings $v$. Pulleys $v'$ $v^2$ for straight and cross drive belts are journaled loosely on the drive shaft and provided at their adjacent sides with clutch members adapted to be engaged separately by a sliding clutch sleeve $v^3$ which is splined on the drive shaft between the pulleys.

An operating arm $w$ for the clutch sleeve is secured to a rod W which extends horizontally lengthwise at one side of the apparatus and is supported in suitable bearings $w'$ $w^2$, Fig. 3. This rod is provided adjacent to opposite ends with adjustable tappet fingers or projections $w^3$ $w^4$. When the lower spreading and scraping mechanism approaches the limit of its movement in one direction, a part secured thereto engages one of the tappets and shifts the rod in one direction to connect the drive shaft with one pulley, and when the spreading and scraping mechanism approaches the limit of its movement in the opposite direction the part thereon engages the other tappet and shifts the rod W in the opposite direction to connect the drive shaft with the other pulley. The two spreading and scraping mechanisms preferably travel simultaneously in opposite directions, but any suitable mechanism for thus moving them can be used.

The two spreading and scraping mechanisms may be used simultaneously for drying materials on opposite sides of the table, or either mechanism can be used separately, as may be desired. Each film of material which is spread upon the surface of the table by the spreading roller when traveling in one direction, becomes thoroughly dried while the roller is moving in the opposite direction out of contact with the table, and before the next film of material is spread upon the table. Each film is thus dried separately and is not disturbed by the operation of the mechanism in adding subsequent films thereto. This produces a uniform drying of all the material, which results in a light flaky product of an excellent and more uniform quality than can be produced in machines in which the material is deposited and dried upon an endless belt where the films tend to crack and peel during the movement of the belt. The lower spreading mechanism operating as described, for spreading the material upon the under side of the table, is especially adapted for thick and viscous materials which do not flow readily and cannot be fed evenly to the table by gravity, but which, under the action of the spreading roller, will adhere to the under surface of the table and can be spread in a thin film thereon.

I claim as my invention:

1. In a desiccating machine, the combination of a stationary drying surface, mechanism comprising spreading and scraping devices which travel along said surface for spreading the material thereon and removing it therefrom, and means for rendering one of said devices inactive while the other is in operation, substantially as set forth.

2. In a desiccating machine, the combination of a drying surface and a spreading mechanism, one of which parts is reciprocated relative to the other, and operating means for causing said spreading mechanism to spread the material on said drying surface during the movement of the reciprocating part in one direction and for holding the spreading mechanism and drying surface out of contact with each other to allow the material to dry on said drying surface during the movement of the reciprocating part in the opposite direction, substantially as set forth.

3. In a desiccating machine, the combination of a stationary drying surface and a mechanism comprising a spreading device which is reciprocated along said drying surface, and means for holding the spreading device in position to spread the material on the drying surface during the movement of said mechanism in one direction and for holding the spreading device out of contact with said surface to allow the material to dry thereon during the movement of said mechanism in the opposite direction, substantially as set forth.

4. In a desiccating machine, the combination of a stationary drying surface and a mechanism comprising spreading and scraping devices which are reciprocated along said drying surface, and means for holding the spreading device in position to spread the material on the drying surface during the movement of said mechanism in one direction and for holding the spreading device out of contact with said surface to allow the material to dry thereon during the movement of said mechanism in the opposite direction, said scraping device being inoperative during the operation of said spreading device, substantially as set forth.

5. In a desiccating machine, the combination of a stationary drying surface and a mechanism comprising spreading and scraping devices which are reciprocated along said drying surface, and means for holding the spreading device in position to spread the material on the drying surface during the movement of said mechanism in one direction and for holding the spreading device out of contact with said surface to allow the material to dry thereon during the movement of said mechanism in the opposite direction, one of said devices being movable out of operative position when the other device is moved into operative position, substantially as set forth.

6. In a desiccating machine, the combination of a drying surface and a spreading and scraping mechanism, one of which parts is movable relative to the other, said spreading and scraping mechanism comprising spreading and scraping devices for spreading the material upon the surface of the table and removing it therefrom, one of said devices being movable out of operative position when the other device is moved into operative position, substantially as set forth.

7. In a desiccating machine, the combination of a stationary drying surface, a spreading roller which travels along the surface, a scraper for removing the dried material from said surface, one of said devices being movable out of operative position when the other device is moved into operative position, and means for supplying liquid material to said roller, substantially as set forth.

8. In a desiccating machine, the combination of a drying table and a spreading mechanism below said table, one of which parts travels relative to the other for spreading the material on the under surface of the table, and means for removing the dried material from said table, substantially as set forth.

9. In a desiccating machine, the combination of a drying table and mechanism which travels below the table and comprises a spreading device for spreading the material on the under surface of said table, and a device for removing the dried material from said table, substantially as set forth.

10. In a desiccating machine, the combination of a drying table, a trough for liquid material which travels below the table, and a spreading roller which rolls against the under surface of the table and deposits the material from the trough upon said under surface of said table, substantially as set forth.

11. In a desiccating machine, the combination of a drying table, a trough for liquid material which travels below the table, a spreading roller which rolls against the under surface of the table and deposits the material from the trough upon said under surface of said table, and means for regulating the quantity of material in said trough, substantially as set forth.

12. In a desiccating machine, the combination of a drying table and a spreading mechanism below said table, one of which parts travels relative to the other for spreading the material on the under surface of the table, means for removing the dried material from the under surface of said table, and a receptacle below the table connected with said spreading mechanism for receiving the dried material, substantially as set forth.

13. In a desiccating machine, the combination of a drying table and mechanism which travels below the table and comprises a spreading device for spreading the material on the under surface of said table, and a receptacle which travels below the table, and means which travel with said receptacle for removing the dried material from the under surface of said table, substantially as set forth.

14. In a desiccating machine, the combination of a drying chamber, a drying table in said chamber, means which travel along said table for spreading the material on the surface thereof, and a reservoir located outside of said chamber which travels along with said spreading means for supplying material to said spreading means, substantially as set forth.

15. In a desiccating machine, the combination of a drying table, spreading mechanisms arranged on opposite sides of said table, means for producing a relative movement between said table and said spreading mechanisms whereby the material is spread upon opposite surfaces of the table, and means for removing the dried material from table, substantially as set forth.

16. In a desiccating machine, the combination of a drying table, spreading mechanisms arranged above and below said table, means for moving said mechanisms along said table to spread the material upon the upper and under surfaces thereof, and means for removing the dried material from the table, substantially as set forth.

17. In a desiccating machine, the combination of a drying table, spreading mechanisms arranged above and below said table, means for simultaneously reciprocating said spreading mechanisms in opposite directions along said table to spread the material upon the upper and under surfaces thereof, and means for removing the dried material from said table, substantially as set forth.

18. In a desiccating machine, the combination of a drying table, and mechanisms which travel above and below said table, each comprising spreading and scraping devices for spreading the material on the upper and under surfaces of said table and for removing it therefrom, substantially as set forth.

19. In a desiccating machine, the combination of a drying table, spreading mechanisms arranged above and below said table, endless flexible connections attached to said upper and lower mechanisms, and means for reciprocating said connections for simultaneously moving said spreading mechanisms in opposite directions along said table, substantially as set forth.

20. In a desiccating machine, the combination of a drying chamber, a table located in said chamber, spreading mechanisms which travel above and below said table in said drying chamber for spreading the material upon the upper and under surfaces of the table, and means for removing the dried material from said table, substantially as set forth.

21. In a desiccating machine, the combination of a drying table, a spreading and scraping mechanism arranged to travel below the table including a trough containing the material and a roller which rolls against the under surface of the table and applies the material from the trough thereon, and a spreading and scraping mechanism arranged to travel above the table and including a roller which rolls upon the upper surface of the table, means for feeding liquid to said roller, and means for controlling the feed of the liquid thereto, substantially as set forth.

Witness my hand, this 14th day of December, 1908.

ELDON R. FILLMORE.

Witnesses:
EDWARD C. HARD,
C. B. HORNBECK.